United States Patent
Stock et al.

(10) Patent No.: US 10,166,643 B2
(45) Date of Patent: Jan. 1, 2019

(54) METHOD FOR MAKING SAFE THE USE OF AT LEAST ONE HAND-HELD POWER TOOL

(71) Applicant: Robert Bosch GmbH, Stuttgart (DE)

(72) Inventors: Joern Stock, Wernau (DE); Florian Esenwein, Leinfelden-Echterdingen (DE); Joachim Schadow, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 15/383,221

(22) Filed: Dec. 19, 2016

(65) Prior Publication Data

US 2017/0173750 A1 Jun. 22, 2017

(30) Foreign Application Priority Data

Dec. 21, 2015 (DE) .......... 10 2015 226 188

(51) Int. Cl.
| | |
|---|---|
| B23Q 11/00 | (2006.01) |
| G08B 21/02 | (2006.01) |
| B25F 5/00 | (2006.01) |
| B23Q 17/12 | (2006.01) |
| B23Q 17/09 | (2006.01) |

(52) U.S. Cl.
CPC ...... *B23Q 11/0085* (2013.01); *B23Q 11/0082* (2013.01); *B23Q 17/0985* (2013.01); *B23Q 17/12* (2013.01); *B25F 5/006* (2013.01); *G08B 21/02* (2013.01); *B23Q 17/098* (2013.01); *B23Q 17/0971* (2013.01)

(58) Field of Classification Search
CPC ............ B23Q 11/0085; B23Q 17/0971; B23Q 17/12; G08B 21/02; B25F 5/006; B25F 3/00; B25F 5/00; H04W 4/70
See application file for complete search history.

(56) References Cited

U.S. PATENT DOCUMENTS

| | | | | |
|---|---|---|---|---|
| 7,784,104 B2* | 8/2010 | Innami | ...................... | B25F 5/00 726/2 |
| 2003/0174049 A1* | 9/2003 | Beigel | ................ | G06K 19/0716 340/10.42 |
| 2004/0108120 A1* | 6/2004 | Wiesner | .................... | B25F 5/00 173/2 |
| 2005/0000998 A1* | 1/2005 | Grazioli | .............. | B25B 27/0085 227/2 |
| 2012/0267134 A1* | 10/2012 | Matthias | ................. | B25F 5/021 173/2 |
| 2014/0159920 A1* | 6/2014 | Furui | ....................... | B25F 5/02 340/870.07 |

FOREIGN PATENT DOCUMENTS

| | | |
|---|---|---|
| DE | 100 29 138 A1 | 1/2002 |
| DE | 10 2006 034 270 A1 | 1/2008 |
| DE | 10 2012 219 295 B3 | 3/2014 |
| DE | 10 2014 206 138 A1 | 10/2015 |
| EP | 1 690 648 A2 | 2/2006 |

* cited by examiner

*Primary Examiner* — Mirza Alam
(74) *Attorney, Agent, or Firm* — Maginot, Moore & Beck LLP

(57) ABSTRACT

A method for making safe the use of at least one hand-held power tool includes providing at least one item of safety information using at least one evaluation unit of an electronic safety device. The at least one item of safety information is based on at least one application-specific characteristic quantity. The electronic safety device is configured to be fastened to an extremity of a user using a fastening unit.

8 Claims, 4 Drawing Sheets

METHOD FOR MAKING SAFE THE USE OF AT LEAST ONE HAND-HELD POWER TOOL

This application claims priority under 35 U.S.C. § 119 to patent application no. DE 10 2015 226 188.3 filed on Dec. 21, 2015 in Germany, the disclosure of which is incorporated herein by reference in its entirety.

BACKGROUND

A method for making safe the use of at least one hand-held power tool has already been proposed.

SUMMARY

A method is proposed for making safe the use of at least one hand-held power tool, in which at least one evaluation unit of an electronic safety device, which is designed to be fastened to an extremity of a user by means of a fastening unit, provides at least one item of safety information in dependence on at least one application-specific characteristic quantity.

This enables a user to be informed in a timely manner concerning critical states. Reliable operator protection and/or a high degree of working safety can be achieved. A "hand-held power tool" is to be understood to mean, in particular, a machine for performing work on workpieces, but advantageously a power drill, a hammer drill and/or percussion hammer, a battery-powered screwdriver, a battery-powered drill, a saw, a plane, a screwdriver, a router, a sander, an angle grinder, a garden appliance and/or a multifunction tool. An "evaluation unit" is to be understood to mean, in particular, a unit having an information input, an information processing system and an information output. Advantageously, the evaluation unit has at least one processor, a storage memory, input and output means, further electrical components, an operating program, closed-loop control routines, open-loop control routines and/or calculation routines. Preferably, the components of the evaluation unit are disposed on a common printed circuit board and/or, advantageously, disposed in a common housing. An "item of safety information" in this context is to be understood to mean, in particular, an item of information relating to safety in the use of the hand-held power tool, in particular an item of information relating to an actual or possible impairment of the safety. For example, the item of safety information indicates technical defects of the hand-held power tool and/or incorrect and/or hazardous use of the hand-held power tool. Preferably, the fastening unit has at least one arm-band and/or ankle-band, an adhesive element, a hook-and-loop element and/or other connecting element, considered appropriate by persons skilled in the art, for connecting to a human body. An "application-specific characteristic quantity" in this context is to be understood to mean, in particular, a quantity, preferably a quantitatively measurable quantity, that characterizes the application, i.e. the work application, of the hand-held power tool, in particular a state of the hand-held power tool and/or a state of a working environment. The application-specific characteristic quantity comprises, for example, a wear quantity, an oscillation pattern, generated noise, in particular a loudness, an electrical resistance, a power consumption, a temperature of at least one component or of the hand-held power tool as a whole, an ambient temperature, a dust load, an air humidity and/or functions of one or more of these quantities. Preferably, in at least one method step, the evaluation unit consolidates at least two characteristic quantities for the purpose of providing the item of safety information. "Designed" is to be understood to mean, in particular, specially programmed, configured and/or equipped. That an object is designed for a particular function is to be understood to mean, in particular, that the object fulfills and/or executes this particular function in at least one application state and/or operating state.

It is additionally proposed that, in at least one method step, the at least one evaluation unit wirelessly exchanges data with the at least one hand-held power tool. This makes it possible to provide a safety device that can be used in a particularly convenient and/or flexible manner. To "exchange wirelessly" is to be understood to mean, in particular, that the evaluation unit is designed to exchange the data via an advantageously bodiless information carrier, for example via sound waves, light waves and/or, preferably, radio waves. Preferably, the evaluation unit exchanges data with the at least one hand-held power tool according to a standard for wireless communication such as, for example, Bluetooth, BLE, WiFi, ZigBee and/or NFC. It is also conceivable for the evaluation unit to exchange data with the at least one hand-held power tool according to a mobile telephony standard.

In an advantageous design, in at least one method step, the at least one evaluation unit evaluates an identifier of the at least one hand-held power tool. This enables the at least one application-specific characteristic quantity to be compared, advantageously, with a reference quantity that can be assigned by means of the identifier of the hand-held power tool. An "identifier" in this context is to be understood to mean, in particular, an item of information relating to an identification of a machine type, a production series or a single device of the hand-held power tool. Preferably, the identifier is stored in a storage memory element of the hand-held power tool. Preferably, in at least one method step, the evaluation unit identifies the machine type, the production series or the individual device of the hand-held power tool by means of the identifier.

In a further advantageous design, in at least one method step, the at least one evaluation unit evaluates the at least one application-specific characteristic quantity, in particular at least one oscillation pattern, in relation to a data history and/or in relation to a reference quantity. This makes it possible to achieve a particularly reliable method for making safe the use of the hand-held power tool. An "oscillation pattern" in this context is to be understood to mean, in particular, a data set that characterizes an oscillation and vibration behavior, in particular over a defined sensing interval, in particular a spectrum, an amplitude characteristic or a frequency characteristic. A "data history" in this context is to be understood to mean, in particular, a quantity or a data set of data, sensed and stored in a defined time period in the past and/or in past applications, relating to the at least one characteristic quantity. A "reference quantity" in this context is to be understood to mean, in particular, a reliable and/or non-critical value range, boundary values of such a value range and/or reliable, discrete values. Preferably, the at least one reference quantity characterizes a state of the at least one hand-held power tool and/or of the working environment.

It is additionally proposed that, in at least one method step, at least one external evaluation unit evaluates data for the purpose of providing the at least one item of safety information, and transmits at least one evaluation result to the at least one evaluation unit. This enables existing resources to be used in an advantageous manner. A high degree of user convenience can be achieved. Elaborate evaluations can be performed. Preferably, the at least one external evaluation unit prepares the data and/or aggregates the data. Preferably, the at least one external evaluation unit evaluates the data in relation to a reference quantity. An "external computing unit" in this context is to be understood to mean, in particular, a mobile computing unit such as a mobile telephone, a tablet or a laptop. Preferably, the at least one evaluation unit and the at least one external evaluation unit exchange data according to a standard for wireless communication, such as, for example, Bluetooth, BLE, WiFi, ZigBee and/or NFC. It is conceivable for the at least one evaluation unit and the at least one external evaluation unit to exchange data according to a mobile telephony standard. It is additionally conceivable for the at least one evaluation unit and the at least one external evaluation unit to exchange data via a network and/or a cloud.

It is additionally proposed that, in at least one method step, at least one position and/or orientation sensor unit senses a position and/or orientation of the fastening unit and transmits this to the at least one evaluation unit. This enables unfavorable, incorrect and/or hazardous handling of the hand-held power tool to be identified and/or avoided. A particularly efficient method can be achieved. A "position" in this context is to be understood to mean, in particular, a position in space relative to a reference point of a, in particular local, positioning system, and/or relative to the fastening unit of the safety device, or relative to another reference point considered appropriate by persons skilled in the art. An "orientation" in this context is to be understood to mean, in particular, an angular position and/or an alignment relative to a reference direction, such as, for example, the direction of gravity and/or a featured position of a, in particular local, positioning system. For example, the at least one position and/or orientation sensor unit comprises a rotation-rate sensor or an acceleration sensor for sensing a position and/or an orientation, or for sensing a change of position and/or change of orientation. It is conceivable for the at least one position and/or orientation sensor unit to comprise further sensors considered appropriate by persons skilled in the art, such as, for example, direction-finding sensors.

It is additionally proposed that, in at least one method step, at least one machine sensor senses at least one application-specific characteristic quantity of the hand-held power tool and transmits it to the at least one evaluation unit. This enables an unfavorable and/or critical state of the hand-held power tool and/or damage to the hand-held power tool to be identified in a particularly reliable manner. A user can be warned in a particularly reliable manner of a hazard and/or of an imminent appliance failure. Preferably, the at least one evaluation unit evaluates data, sensed by the at least one machine sensor, with respect to existing damage and/or malfunctions and/or with respect to malfunctions and/or damage that may be expected. Preferably, the at least one machine sensor is disposed in and/or on a housing of the at least one hand-held power tool. It is conceivable for the at least one machine sensor to be disposed outside of, and/or separately from, the housing of the at least one hand-held power tool and, for example, to sense a noise of the at least one hand-held power tool. For example, the at least one machine sensor is realized as a wear sensor, a vibration sensor, a temperature sensor, an acoustic sensor, an optical sensor, an acceleration sensor, a rotation-rate sensor and/or as an electrical measuring circuit.

In an advantageous design, in at least one method step, the at least one evaluation unit exchanges data with at least one appliance database. This makes it possible to achieve an extensive database for evaluation of the at least one application-specific characteristic quantity. A particularly refined evaluation can be achieved. Incorrect evaluation results can be avoided. Preferably, the at least one evaluation unit exchanges with the at least one appliance database data relating to a machine type, a production series and/or to an individual device of the hand-held power tool. Preferably, the at least one evaluation unit reads out from the at least one appliance database data relating to at least one reference quantity. It is conceivable for the at least one evaluation unit to transmit data to the appliance database for storage and/or for data exchange with other evaluation units. It is conceivable for the at least one evaluation unit and the at least one appliance database to exchange data with each other by means of a cloud and/or by means of a network. It is also conceivable for the at least one evaluation unit and the at least one appliance database to exchange data by means of point-to-point communication.

It is additionally proposed that, in at least one method step, the at least one evaluation unit evaluates servicing data. This enables highly reliable servicing to be achieved. Particularly reliable and/or convenient servicing management can be achieved. "Servicing data" in this context are to be understood to mean, in particular, servicing intervals and servicing work assigned to the servicing intervals. "Servicing intervals" in this context are to be understood to mean, in particular, intervals related to an appliance age and/or to an accumulated operating period. Preferably, the at least one appliance database is designed to provide the servicing data.

In an advantageous design, in at least one method step, the at least one evaluation unit transmits the at least one item of safety information to at least one output unit of the safety device, for the purpose of output to a user. In this way, a user can be informed, in a particularly convenient manner, concerning a safe or unsafe state of the at least one hand-held power tool. Preferably, the at least one output unit comprises at least one visual display unit. It is conceivable for the at least one output unit to comprise further visual output elements, as well as acoustic and/or haptic output elements. Preferably, the at least one output unit is disposed in or on the housing of the at least one fastening unit. It is conceivable for the at least one output unit to be realized as an external output unit, for example as part of a mobile telephone, tablet or laptop. Preferably, the at least one evaluation unit initiates measures and transmits the item of safety information to a safety information system and/or to a warning system.

Additionally proposed is an electronic safety device for making safe the use of at least one hand-held power tool, having at least one fastening unit for fastening to an extremity of a user, and having at least one evaluation unit, which is designed to provide at least one item of safety information, at least in dependence on at least one application-specific characteristic quantity, in the case of application of the at least one hand-held power tool. This enables a particularly reliable and/or versatile safety device to be provided. Preferably, the at least one fastening unit of the electronic safety device has at least one arm-band and/or ankle-band. Preferably, the safety device has at least one input unit for inputting user commands, and/or has an energy supply.

The method and the electronic safety device according to the disclosure in this case are not intended to be limited to the application and embodiment described above. In particular, the method and the electronic safety device according to the disclosure may have individual elements, components and units, and method steps, that differ in number from a number stated herein, in order to fulfill a principle of function described herein. Moreover, in the case of the value ranges specified in this disclosure, values lying within the stated limits are also to be deemed as disclosed and applicable in any manner.

BRIEF DESCRIPTION OF THE DRAWINGS

Further advantages are disclosed by the following description of the drawings. The drawings show two exemplary embodiments of the disclosure. The drawing, the description and the claims contain numerous features in combination. Persons skilled in the art will also expediently consider the features individually and combine them to create appropriate further combinations.

There are shown in.

DETAILED DESCRIPTION

Figure 1:
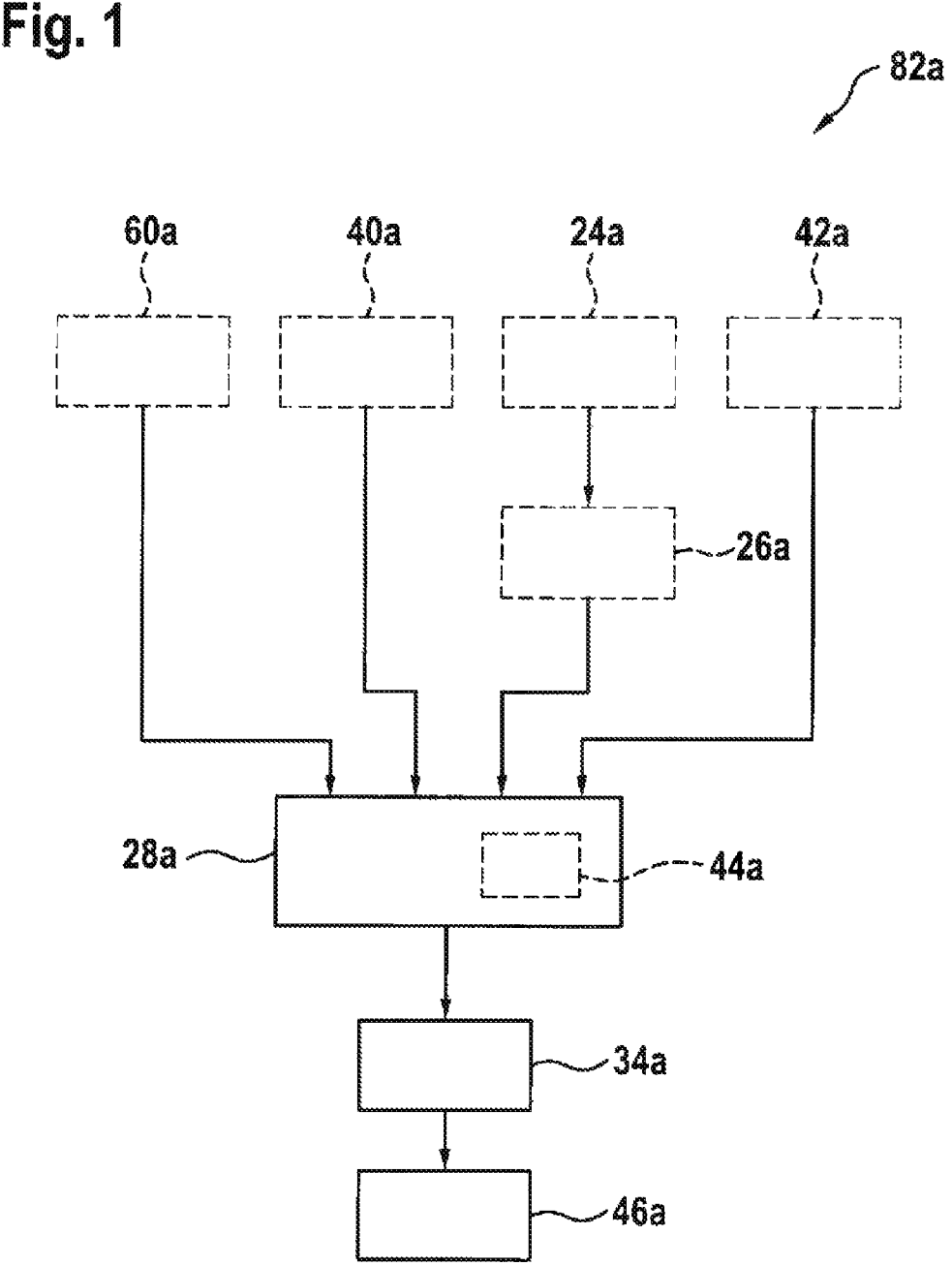
FIG. 1 illustrates a flow diagram of a method according to the disclosure.

FIG. 1 shows a flow diagram 82a of a method for making safe the use of at least one hand-held power tool 10a. In the flow diagram 82a optional method steps are represented by broken lines. In the method, at least one evaluation unit 14a of an electronic safety device 18a provides at least one item of safety information in dependence on at least one application-specific characteristic quantity. In the present exemplary embodiment, the hand-held power tool 10a is realized as an angle grinder (see FIG. 2).

Figure 3:
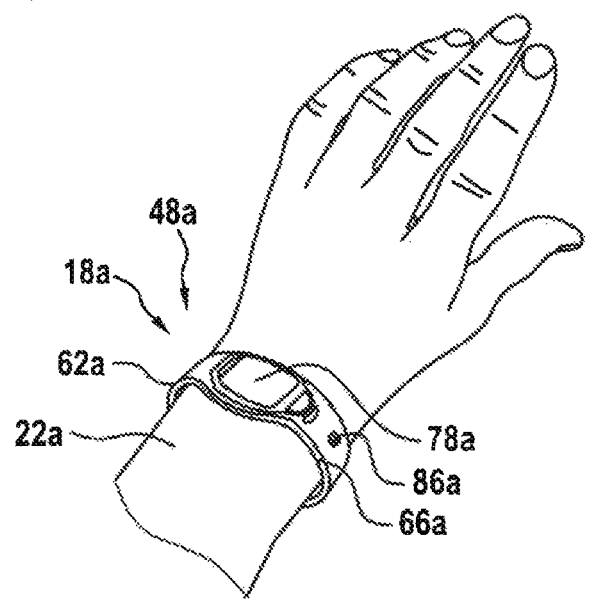
FIG. 3 illustrates a safety device for implementing the method.

The evaluation unit 14a is designed for fastening to an extremity 22a of a user, by means of a fastening unit 20a (see FIG. 3). In at least one method step 60a, the evaluation unit 14a is fastened to an extremity 22a of the user by means of the fastening unit 20a of the authorization device. In the present exemplary embodiment, the fastening unit 20a has an arm-band 62a. Two open ends of the arm-band 62a are joined together in a closing operation. For example, in a closing operation, a closure element 64a joins the two open ends of the arm-band 62a. The ends are joined together in a separable manner. It is also conceivable for the arm-band 62a to be composed of a closed ring of an elastically stretchable material. The arm-band 62a is then slipped on, in order to be placed over the extremity 22a. When in a closed state, the arm-band 62a encompasses the extremity 22a, for example an arm or a leg, of the user, and the fastening unit 20a holds the evaluation unit 14a at the extremity 22a. The fastening unit 20a has a housing 66a. The evaluation unit 14a is disposed in the housing 66a of the fastening unit 20a. The fastening unit 20a is designed to fasten the evaluation unit 14a to the extremity 22a of the user.

Figure 4:
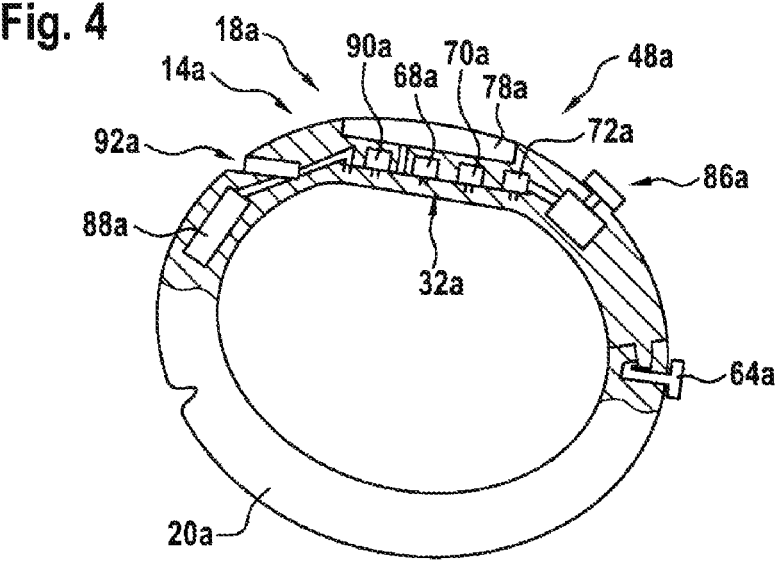
FIG. 4 illustrates a schematic sectional view of the safety device.

In at least one method step 24a, the evaluation unit 14a wirelessly exchanges data with the at least one hand-held power tool 10a. In the method step 24a, the evaluation unit 14a transmits data to the hand-held power tool 10a by means of a communication interface 72a (see FIG. 4). In the method step 24a, the evaluation unit 14a receives data from the hand-held power tool 10a by means of the communication interface 72a. In the present exemplary embodiment, the evaluation unit 14a receives data relating to an oscillation pattern of the hand-held power tool 10a. The evaluation unit 14a receives, for example, data relating to amplitudes and frequencies of oscillations of the hand-held power tool 10a. The evaluation unit 14a receives, for example, data relating to a temperature of components of the hand-held power tool 10a.

In at least one method step 26a, the evaluation unit 14a evaluates an identifier of the at least one hand-held power tool 10a. The evaluation unit 14a receives the identifier of the hand-held power tool 10a by means of the communication interface 72a for wireless communication. In the method step 26a, the evaluation unit 14a identifies the at least one hand-held power tool 10a, a production series and/or a machine type of the hand-held power tool 10a, by means of the identifier. In the present exemplary embodiment, the identifier has unique information relating to an identification of the hand-held power tool 10a. It is conceivable for the identifier to have only information relating to a production series of the hand-held power tool 10a. It is conceivable for the identifier to have only information relating to a machine type of the hand-held power tool 10a.

In at least one method step 28a, the evaluation unit 14a evaluates the at least one application-specific characteristic quantity in relation to a data history and/or in relation to a reference quantity. In the present exemplary embodiment, the evaluation unit 14a evaluates a plurality of application-specific characteristic quantities. The application-specific characteristic quantities comprise an oscillation pattern and a data set of temperatures of components of the hand-held power tool 10a. The evaluation unit 14a compares the application-specific characteristic quantities with data relating to the characteristic quantities that have been sensed over a time period in the past. The evaluation unit 14a provides the safety information in dependence on deviations of the application-specific characteristic quantities from values in the data history and/or from reference quantities. For example, the safety information is dependent on large fluctuations of the characteristic quantities. In the present exemplary embodiment, the reference quantities comprise maximum values for oscillation amplitudes and for temperatures of components. In the present exemplary embodiment, the reference quantities comprise a frequency spectrum for oscillations of the hand-held power tool 10a when in an operating state.

In at least one method step 34a, at least one position and/or orientation sensor unit 32a senses a position and/or orientation of the fastening unit 20a and transmits this to the at least one evaluation unit 14a. The position and/or orientation sensor unit 32a is disposed in the housing 66a of the fastening unit 20a. In the present exemplary embodiment, the position and/or orientation sensor unit 32a comprises an acceleration sensor 68a and a rotation-rate sensor 70a. The position and/or orientation sensor unit 32a senses an orientation of the fastening unit 20a relative to the gravitational field of the earth, and consequently an orientation of the extremity 22a of the user relative to the gravitational field.

The evaluation unit 14a evaluates the data of the position and/or orientation sensor unit 32a, and assigns them to reference data relating to the position and/or orientation for the machine type of the hand-held power tool 10a. For example, the evaluation unit 14a identifies a hazardous and/or detrimental handling of the hand-held power tool 10a. It is also conceivable for the evaluation unit 14a to identify an unfavorable handling of the hand-held power tool 10a, in which a high degree of wear of the hand-held power tool 10a occurs.

In at least one method step 40a, a machine sensor 36a and a further machine sensor 38a sense at least one application-specific characteristic quantity of the hand-held power tool 10a, and transmit this to the at least one evaluation unit 14a. In the present exemplary embodiment, the machine sensor 36a is realized as a vibration sensor. The machine sensor 36a is connected to a housing 74a of the hand-held power tool 10a. The further machine sensor 38a is realized as a temperature sensor. The machine sensor 36a senses, for example, oscillations when the hand-held power tool 10a is idling in a state without a clamped-in insert tool. The evaluation unit 14a evaluates the oscillations and checks, for example, a bearing state. The machine sensor 36a senses, for example, oscillations when the hand-held power tool 10a is idling in a state with a clamped-in insert tool. The evaluation unit 14a evaluates the oscillations and checks these, for example with respect to an unbalance. It is conceivable for the evaluation unit 14a to initiate measures that counteract an unbalance. For example, the open-loop and/or closed-loop control unit may adjust a motor characteristic of a drive unit of the hand-held power tool 10a in dependence on the unbalance.

In at least one method step 42a, the at least one evaluation unit 14a exchanges data with at least one appliance database. In the method step 42a, the appliance database provides the reference data, and exchanges these data with the evaluation unit 14a. The reference data are indirectly or directly assigned to the identifier of the hand-held power tool 10a. The evaluation unit 14a and the appliance database are integrated into the same network. The evaluation unit 14a and the appliance database exchange the data by means of the network.

In at least one method step 44a, the at least one evaluation unit 14a evaluates servicing data. In the present exemplary embodiment, the appliance database provides the servicing data. The servicing data comprise servicing work and the servicing intervals assigned to the servicing work. The evaluation unit 14a requests the servicing data from the appliance database. The hand-held power tool 10a comprises an elapsed operating-time counter 76a. The evaluation unit 14a requests the elapsed operating time of the hand-held power tool 10a from the elapsed operating-time counter 76a. In the method step 44a, the evaluation unit 14a compares a current date and the elapsed operating time with the servicing intervals of the servicing data. For example, the evaluation unit 14a checks the replacement intervals of wearing parts and/or safety-relevant parts such as carbon brushes, bearings and/or protective devices.

In at least one method step 46a, the at least one evaluation unit 14a transmits the at least one item of safety information to an output unit 48a of the safety device 18a, for the purpose of outputting to a user. The item of safety information indicates to the user, for example, an incorrect, hazardous and/or fatiguing manner of handling. The safety information comprises, for example, an instruction for better handling. The safety information comprises, for example, an indication of bearing damage. A display 78a of the output unit 48a displays the safety information in a manner that is discernible by the user. The safety information comprises data relating to infringement of safety criteria, for example by damage to the hand-held power tool 10a, by the occurrence of wear on the hand-held power tool 10a, by an expired servicing interval and/or an unfavorable orientation and/or position of the hand-held power tool 10a.

Figure 2:
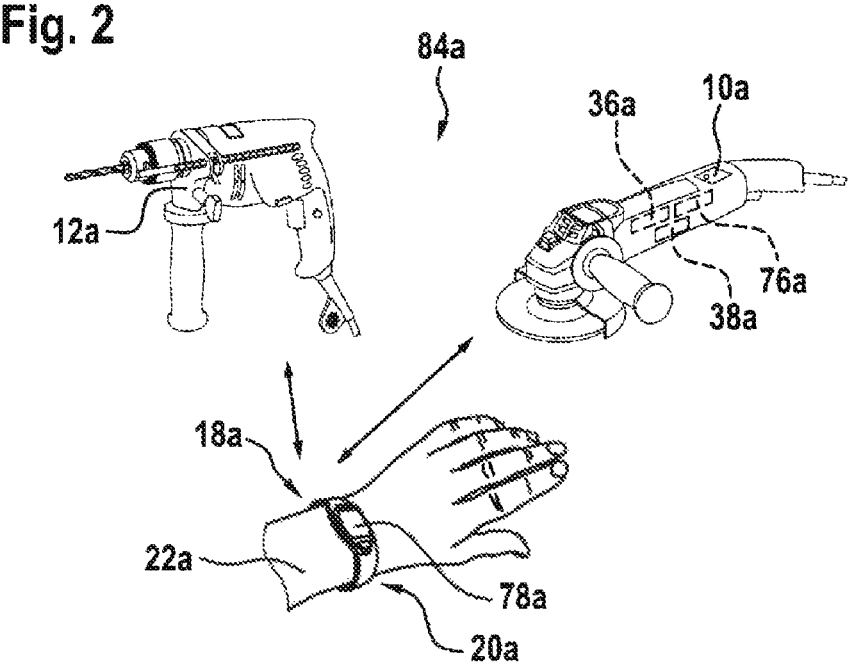
FIG. 2 illustrates an appliance system for implementing the method.

FIG. 2 shows an appliance system 84a, having an electronic safety device 18a for making safe the use of the at least one hand-held power tool 10a. The safety device 18a comprises position and orientation sensor unit 32a, the evaluation unit 14a, the fastening unit 20a and the output unit 48a. The evaluation unit 14a comprises a processor and storage unit 90a. The safety device 18a additionally comprises an energy supply 88a and an input unit 86a, as well as an electrical interface 92a. The appliance system 84a comprises a further hand-held power tool 12a. In the present exemplary embodiment, the further hand-held power tool 12a is realized as a hammer drill. In at least one method step, the evaluation unit 14a wirelessly exchanges data with the further hand-held power tool 12a. In at least one method step, the evaluation unit 14a exchanges an identifier of the further hand-held power tool 12a, in a manner similar to evaluation of the identifier of the hand-held power tool 10a realized as an angle grinder. The evaluation unit 14a provides an item of safety information in dependence on an application-specific characteristic quantity of the further hand-held power tool 12a.

Figure 5:
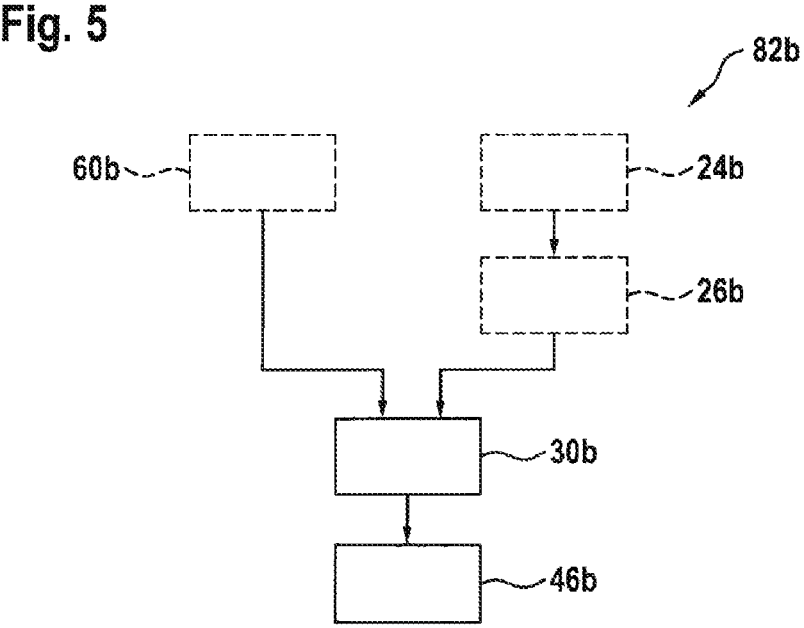
FIG. 5 illustrates a flow diagram of a further example of the method, with evaluation by an external evaluation unit.
Figure 6:
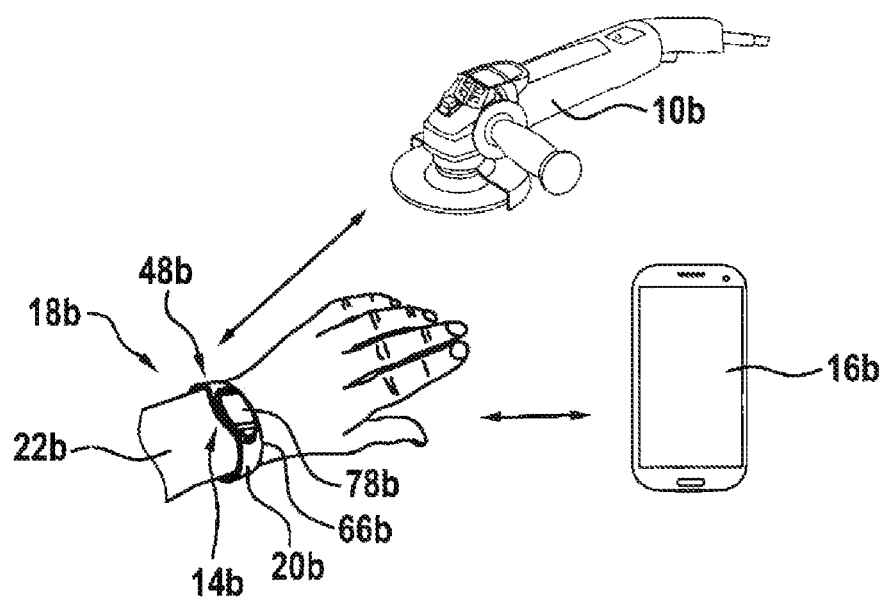
FIG. 6 illustrates an appliance system for implementing the method.

A further exemplary embodiment of the disclosure is shown in FIGS. 5 and 6. The descriptions and the drawings that follow are limited substantially to the differences between the exemplary embodiments, and in principle reference may also be made to the drawings and/or the description of the other exemplary embodiment of FIGS. 1 to 4 in respect of components that have the same designation, in particular in respect of components denoted by the same references. To distinguish the exemplary embodiments, the letter a has been appended to the references of the exemplary embodiment in FIGS. 1 to 4. In the exemplary embodiment of FIGS. 5 and 6, the letter a has been replaced by the letter b.

FIG. 5 shows a flow diagram 82b of a method for making safe the use of at least one hand-held power tool 10b, for a further exemplary embodiment. In the flow diagram 82a optional method steps are represented by broken lines. In the method, at least one evaluation unit 14b of an electronic safety device 18b provides at least one item of safety information in dependence on at least one application-specific characteristic quantity. Like the previous exemplary embodiment, the hand-held power tool 10b is realized as an angle grinder (see FIG. 6).

The evaluation unit 14b is provided on an extremity 22b of a user, to be fastened by means of a fastening unit 20b. In at least one method step 60b, the evaluation unit 14b is fastened to an extremity 22b of the user by means of the fastening unit 20b of the authorization device. The fastening unit 20b has a housing 66b. The evaluation unit 14b is disposed in the housing 66b of the fastening unit 20b. The fastening unit 20b is designed to fasten the evaluation unit 14b to the extremity 22b of the user.

In at least one method step 24b, the evaluation unit 14b wirelessly exchanges data with the at least one hand-held power tool 10b. In the method step 24b, the evaluation unit 14b transmits data to the hand-held power tool 10b by means of a communication interface. In the method step 24b, the evaluation unit 14b receives data from the hand-held power tool 10b by means of the communication interface. The data comprise application-specific characteristic quantities, such as an oscillation pattern and data relating to a temperature of components of the hand-held power tool 10b. In at least one method step 26b, like the previous exemplary embodiment, the evaluation unit 14b evaluates an identifier of the at least one hand-held power tool 10b.

In at least one method step 30b, an external evaluation unit 16b evaluates data for the purpose of providing the at least one item of safety information, and transmits at least one evaluation result to the at least one evaluation unit 14b. In the present exemplary embodiment, the external evaluation unit 16b is realized as a mobile computing unit. The mobile computing unit is realized as part of a mobile telephone. In the method step 30b, the evaluation unit 14b and the external evaluation unit 16b wirelessly exchange data. The evaluation unit 14b and the external evaluation unit 16b exchange data relating to the identifier of the hand-held power tool 10b, and application-specific characteristic quantities and reference data.

It is conceivable for the external evaluation unit 16b to request reference data directly from an appliance database. The external evaluation unit 16b evaluates the identifier, the application-specific characteristic quantities and the reference data. The external evaluation unit 16b determines an evaluation result, which depends on the characteristic quantity of the hand-held power tool 10b, on application-specific characteristic quantities and/or on reference data. The safety information comprises the evaluation result of the external evaluation unit 16b. It is conceivable for the external evaluation unit 16b to evaluate a specific characteristic quantity sensed by a machine sensor. It is conceivable for the external evaluation unit 16b to determine the evaluation result in dependence on servicing data.

In at least one method step 46b, the at least one evaluation unit 14b transmits the at least one item of safety information, which comprises the evaluation result of the external evaluation unit 16b, to an output unit 48b of the safety device 18b, for output to a user. A display 78b of the output unit 48b displays the safety information in a manner that is discernible by the user.

What is claimed is:

1. A method for making safe the use of a hand-held power tool, comprising:
    receiving, with a processor of an electronic safety device, an application-specific characteristic quantity from a machine sensor of the hand-held power tool configured to measure the application-specific characteristic quantity, application-specific characteristic quantity relating to at least one of a state of the hand-held power tool and a state of a working environment of the hand-held power tool;
    receiving, with the processor of the electronic safety device, an identifier of the hand-held power tool from the hand-held power tool;
    retrieving, with the processor of the electronic safety device, reference data assigned to the identifier from an appliance database;
    comparing the application-specific characteristic quantity with the reference data; and
    outputting, with an output device of the electronic safety device, at least one item of safety information using to the user in response to the comparison of the application-specific characteristic quantity with the reference data indicating infringement of a safety criterion,
    wherein the electronic safety device has a fastener configured to fasten the electronic safety device to an extremity of a user.

2. The method according to claim 1, further comprising:
    wirelessly exchanging data between the hand-held power tool and the processor of the electronic safety device.

3. The method according to claim 1, further comprising:
    evaluating the application-specific characteristic quantity in relation to a data history.

4. The method according to claim 1, further comprising:
    comparing the application-specific characteristic quantity with the reference data using a processor of an external device; and
    transmitting a result of the comparison of the application-specific characteristic quantity with the reference data from the external device to the processor of the electronic safety device.

5. The method according to claim 1, further comprising:
    sensing at least one of (i) a position and (ii) an orientation of the fastener using at least one of a position sensor and an orientation sensor of the electronic safety device; and
    transmitting the at least one of (i) the position and (ii) the orientation to the processor of the electronic safety device.

6. The method according to claim 1, further comprising:
    retrieving, with the processor of the electronic safety device, servicing data assigned to the identifier from the appliance database.

7. An electronic safety device for making safe the use of a hand-held power tool comprising:
    a fastener configured to fasten the electronic safety device to an extremity of a user;
    an output device; and
    a processor configured to:
        receive an application-specific characteristic quantity from a machine sensor of the hand-held power tool configured to measure the application-specific characteristic quantity, application-specific characteristic quantity relating to at least one of a state of the hand-held power tool and a state of a working environment of the hand-held power tool;
        receive an identifier of the hand-held power tool from the hand-held power tool;
        retrieve reference data assigned to the identifier from an appliance database;
        compare the application-specific characteristic quantity with the reference data; and
        operate the output device output at least one item of safety information in response to the comparison of the application-specific characteristic quantity with the reference data indicating infringement of a safety criterion.

8. The method according to claim 3, wherein the application-specific characteristic quantity is at least one oscillation pattern.

* * * * *